United States Patent
Orzol et al.

(10) Patent No.: US 11,886,883 B2
(45) Date of Patent: Jan. 30, 2024

(54) DEPENDENCY SKIPPING IN A LOAD-COMPARE-JUMP SEQUENCE OF INSTRUCTIONS BY INCORPORATING COMPARE FUNCTIONALITY INTO THE JUMP INSTRUCTION AND AUTO-FINISHING THE COMPARE INSTRUCTION

(71) Applicant: INTERNATIONAL BUSINESS MACHINES CORPORATION, Armonk, NY (US)

(72) Inventors: Nicholas R. Orzol, Austin, TX (US); Mehul Patel, Austin, TX (US); Dung Q. Nguyen, Austin, TX (US); Brian D. Barrick, Pflugerville, TX (US); Richard J. Eickemeyer, Rochester, MN (US); John B Griswell, Jr., Austin, TX (US); Balaram Sinharoy, Lagrangeville, NY (US); Brian W. Thompto, Austin, TX (US); Ophir Erez, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/458,407

(22) Filed: Aug. 26, 2021

(65) Prior Publication Data
US 2023/0068640 A1 Mar. 2, 2023

(51) Int. Cl.
G06F 9/30 (2018.01)
G06F 9/38 (2018.01)

(52) U.S. Cl.
CPC ........ *G06F 9/3838* (2013.01); *G06F 9/30043* (2013.01); *G06F 9/30058* (2013.01); *G06F 9/30069* (2013.01)

(58) Field of Classification Search
CPC .............. G06F 9/3838; G06F 9/30043; G06F 9/30058; G06F 9/30069
See application file for complete search history.

(56) References Cited

U.S. PATENT DOCUMENTS

| | | | | |
|---|---|---|---|---|
| 5,287,467 A | * | 2/1994 | Blaner | G06F 9/3832 |
| | | | | 712/240 |
| 6,338,136 B1 | * | 1/2002 | Col | G06F 9/3806 |
| | | | | 712/210 |

(Continued)

OTHER PUBLICATIONS

Bilardi, G. et al., "The Speculative Prefetcher and Evaluator Processor for Pipelined Memory Hierarchies", IEEE (2006); 15 pgs.

(Continued)

*Primary Examiner* — Shawn Doman
(74) *Attorney, Agent, or Firm* — Intelletek Law Group, PLLC; Gabriel Daniel, Esq.

(57) ABSTRACT

A method of performing instructions in a computer processor architecture includes determining that a load instruction is being dispatched. Destination related data of the load instruction is written into a mapper of the architecture. A determination that a compare immediate instruction is being dispatched is made. A determination that a branch conditional instruction is being dispatched is made. The branch conditional instruction is configured to wait until the load instruction produces a result before the branch conditional instruction issues and executes. The branch conditional instruction skips waiting for a finish of the compare immediate instruction.

20 Claims, 5 Drawing Sheets

(56) References Cited

U.S. PATENT DOCUMENTS

| | | | |
|---|---|---|---|
| 6,647,489 B1 * | 11/2003 | Col | G06F 9/30094 712/226 |
| 6,675,372 B1 | 1/2004 | Damron | |
| 7,086,035 B1 | 8/2006 | Mericas | |
| 7,606,979 B1 | 10/2009 | Rozas et al. | |
| 7,716,457 B2 | 5/2010 | Caprioli et al. | |
| 7,721,070 B2 | 5/2010 | Nguyen et al. | |
| 7,818,551 B2 | 10/2010 | Joao et al. | |
| 8,635,437 B2 | 1/2014 | Henry et al. | |
| 9,176,737 B2 | 11/2015 | Reid | |
| 9,239,735 B2 * | 1/2016 | Anderson | G06F 9/3802 |
| 9,542,191 B2 | 1/2017 | Caprioli et al. | |
| 10,776,122 B2 | 9/2020 | Genden et al. | |
| 2004/0128483 A1 * | 7/2004 | Grochowski | G06F 9/30181 712/217 |
| 2007/0234019 A1 * | 10/2007 | Terashima | G06F 9/30094 712/234 |
| 2007/0288731 A1 | 12/2007 | Bradford et al. | |
| 2014/0281397 A1 * | 9/2014 | Loktyukhin | G06F 9/30094 712/208 |
| 2017/0235638 A1 | 8/2017 | Knauth et al. | |
| 2018/0004527 A1 | 1/2018 | Adeeb et al. | |
| 2019/0198132 A1 * | 6/2019 | Dusanapudi | G11C 29/50 |
| 2019/0384607 A1 | 12/2019 | Orzol et al. | |
| 2020/0026521 A1 * | 1/2020 | Ward | G06F 9/3851 |
| 2020/0201639 A1 * | 6/2020 | Bowman | G06F 9/30032 |
| 2022/0137976 A1 * | 5/2022 | Golla | G06F 9/3838 712/219 |

OTHER PUBLICATIONS

Chen-Yong, C. et al., "Skipper: A Microarchitecture For Exploiting Control-flow Independence"; IEEE (2001); 12 pgs.

* cited by examiner

DEPENDENCY SKIPPING IN A LOAD-COMPARE-JUMP SEQUENCE OF INSTRUCTIONS BY INCORPORATING COMPARE FUNCTIONALITY INTO THE JUMP INSTRUCTION AND AUTO-FINISHING THE COMPARE INSTRUCTION

BACKGROUND

Technical Field

The present disclosure generally relates to computer programming, and more particularly, to a dependency skipping execution with auto-finish for a microprocessor.

Description of the Related Art

For a conventional Load>Compare Immediate>Conditional Branch sequence, the typical process has the Compare instruction wait for the Load instruction to produce the result before the Compare instruction can be issued and executed. The Conditional Branch instruction will also wait for the Compare instruction to execute and provide the control register (CR0) data before the Branch instruction can be issued and executed.

SUMMARY

According to an embodiment of the present disclosure, a method of performing instructions in a computer processor architecture is provided. The method includes determining that a load instruction is being dispatched. Destination related data of the load instruction is written into a mapper of the architecture. A determination that a compare immediate instruction is being dispatched is made. A determination that a branch conditional instruction is being dispatched is made. The branch conditional instruction is configured to wait until the load instruction produces a result before the branch conditional instruction issues and executes. The branch conditional instruction skips waiting for a finish of the compare immediate instruction.

According to an embodiment of the present disclosure, a method of performing instructions in a computer processor architecture is provided. The method includes determining that a load instruction is being dispatched. Destination related data of the load instruction is written into a mapper of the architecture. A determination that a compare immediate instruction is being dispatched is made. A determination that a branch conditional instruction is being dispatched is made. The mapper is read for load instruction destination related data. The load instruction destination related data is written into the compare immediate instruction. The load instruction destination related data is used by the compare immediate instruction, during a finish of the compare immediate instruction. The branch conditional instruction is configured to wait until the load instruction produces a result before the branch conditional instruction issues and executes. The branch conditional instruction skips waiting for the finish of the compare immediate instruction. The finish of the compare immediate instruction is an auto-finish step triggered in response to the branch conditional instruction being dispatched. The load instruction destination related data in the compare immediate instruction is accessed in response to the conditional branch instruction being dispatched for auto-finishing of the compare immediate instruction. In addition, the load instruction destination related data in the compare immediate instruction is sent to a finish logic without waiting for the finish of the compare immediate instruction.

According to an embodiment of the present disclosure, a computer processor architecture is provided. The architecture comprises a dispatch module configured to determine that a load instruction is being dispatched. Destination related data of the load instruction is written into a mapper of the architecture. A compare immediate instruction being dispatched determination is made. A branch conditional instruction being dispatched determination is made. The branch conditional instruction is configured to wait until the load instruction produces a result before the branch conditional instruction issues and executes. The branch conditional instruction skips waiting for a finish of the compare immediate instruction.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to computer processor architecture and instruction processing. Generally, the embodiments may be practiced in the fields of computers.

In the subject disclosure that follows, embodiments propose a computer chip processing architecture which skips the dependency associated with a compare instruction in a "load, compare, branch" type sequence of instructions. There is a time and resource expenditure in the conventional process that makes processing inefficient. The inefficiency may become more identifiable as processor architectures are designed to handle increasing numbers of instructions per second. Embodiments of the subject technology improve the efficiency of instruction processing by finishing the branch conditional instruction upon the load instruction producing a result, without waiting for the results of the compare instruction. The time required to process an instruction sequence is reduced and, in some instances, the resources for processing may be reduced.

Example Methodology:

In the following methods, flowcharts are shown to help describe the processes involved. It should be understood that the subject disclosure relates to computer processor chip technology (for example, microprocessors, central processing units, and the like), and that the steps in the processes disclosed are implementing executable instructions within a processor architecture.

Figure 1:
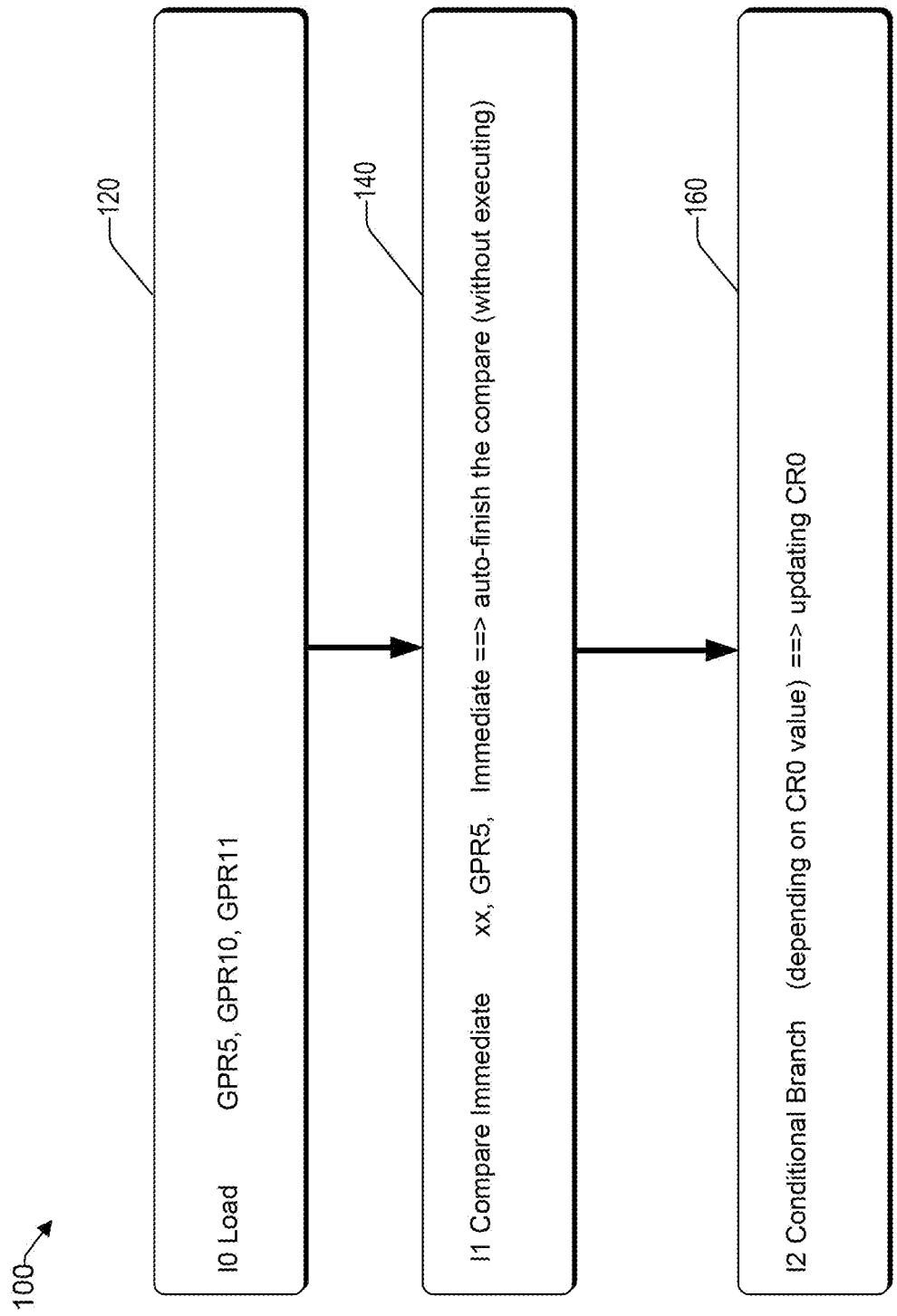
FIG. 1 is a flowchart of a method performing an instruction sequence in a microprocessor according to some embodiments.

Referring now to FIG. 1, a method 100 (sometimes referred to simply as the "method 100") is shown according to an exemplary embodiment. In FIG. 1, a three-part instruction sequence for execution by a processor is shown (I0 120 to I1 140 to I2 160, where I0 is the oldest instruction). According to embodiments of the present disclosure, the architecture for execution of the sequence may be configured to have the Branch instruction (I2) 160 wait for the Load instruction (I0) 120 to produce the result for GPR5 before the Branch instruction 160 can be issued and executed. The Compare instruction (I1) 140 may auto-finish at Dispatch time and may not need to be written into the Issue Queue, and may not be issued/executed. When the Branch instruction (I2) 160 is dispatched, it will grab information relevant to execution of the Compare instruction 140. The Branch instruction 160 performs the compare computation and writes the correct CR0 register when it finishes execution. An example of details of the architecture flow are shown below in FIG. 2.

Figure 2A:
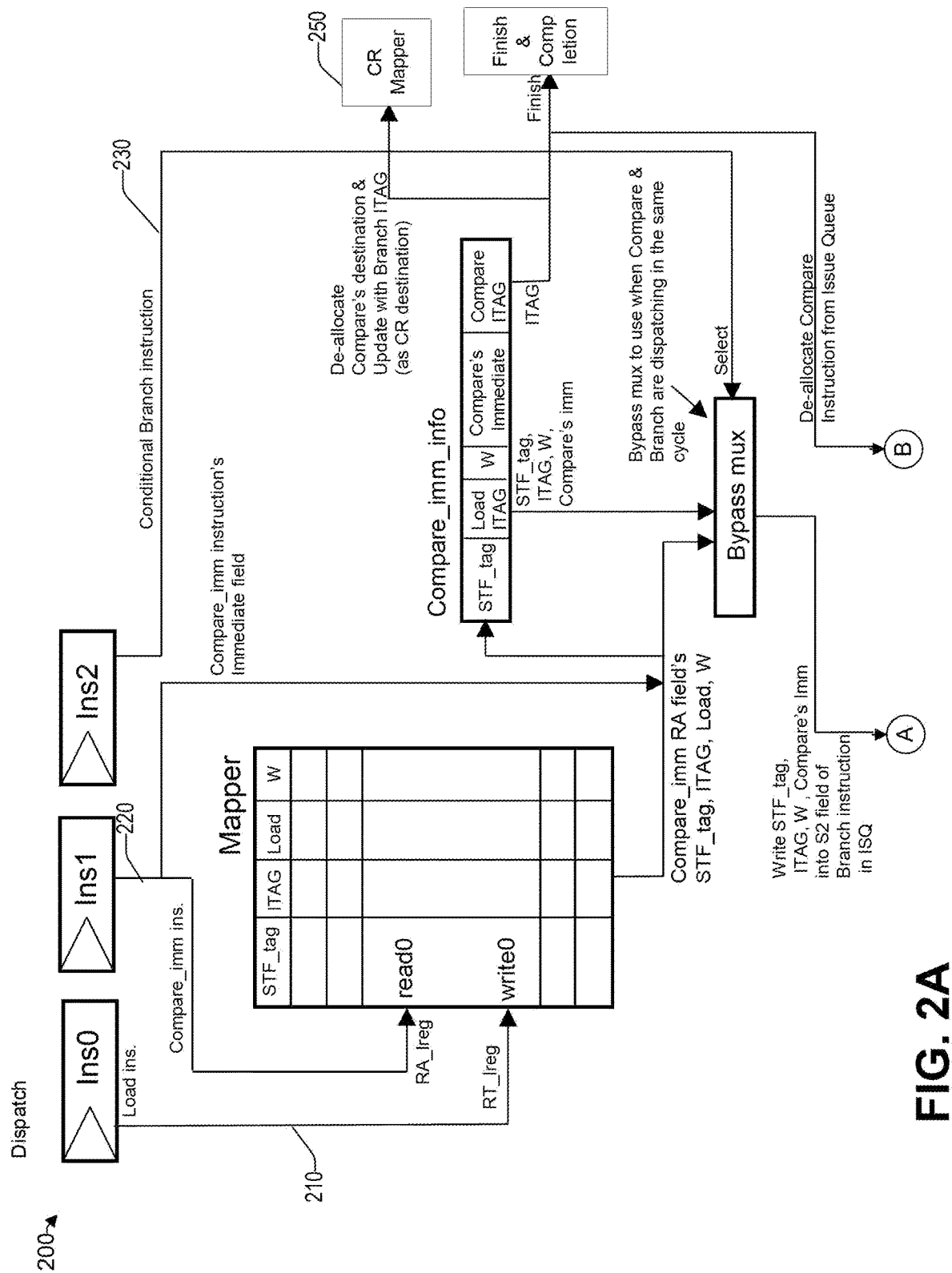
FIGS. 2A and 2B illustrate a flowchart of a method for processing an instruction sequence with dependency skipping in a microprocessor according to embodiments.
Figure 2B:
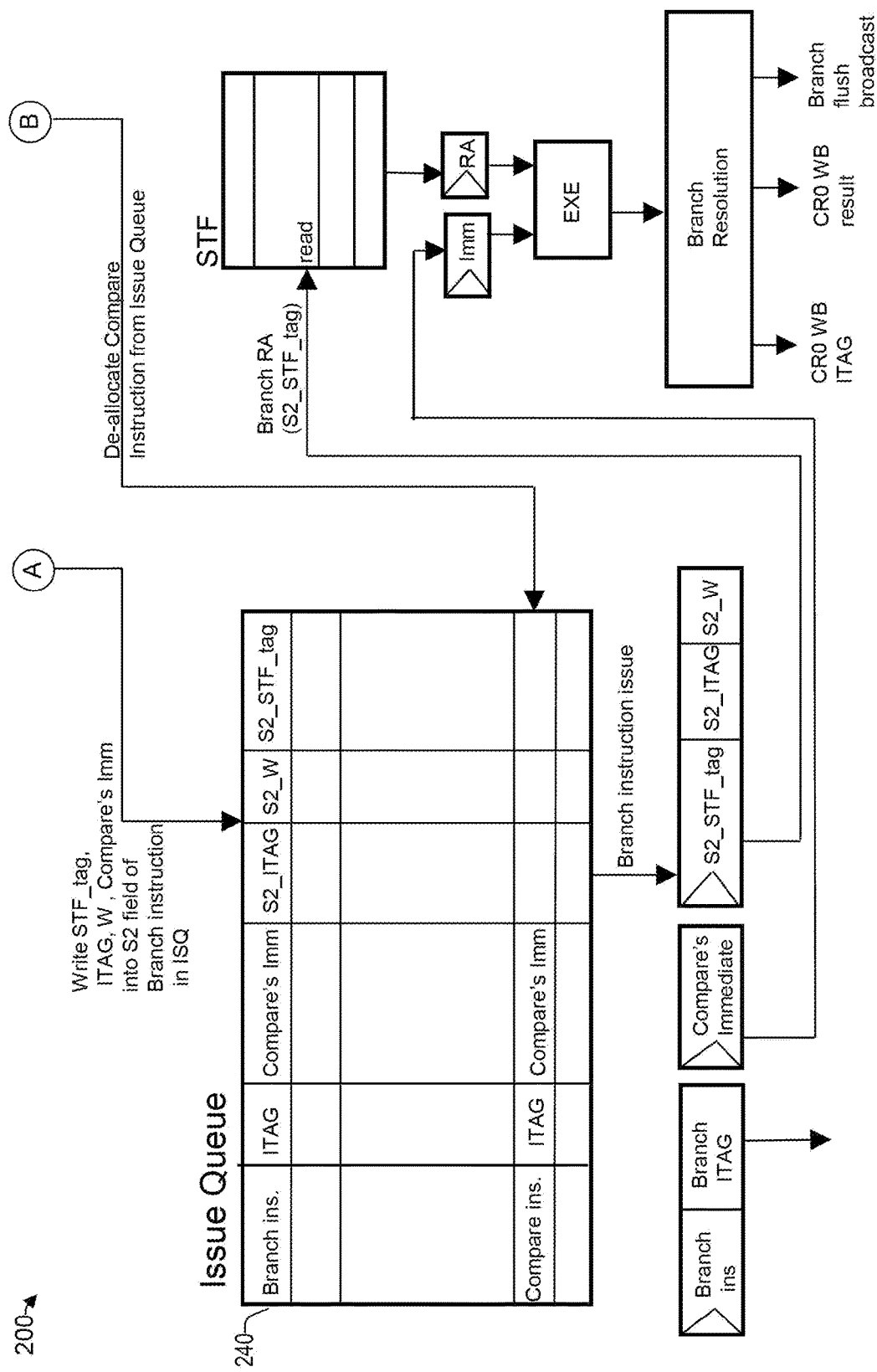

Referring now to FIG. 2, a method 200 of processing instructions in a microprocessor is shown according to an exemplary embodiment. In the method 200, embodiments may be configured to allow the Conditional Branch instruction 230 to skip waiting for the Compare Immediate instruction 220 to execute. Instead, the Conditional Branch instruction 230 waits for the Load instruction 210 to execute and produces the result. When the Load instruction 210 is producing the result, the Conditional Branch instruction 230 is woken up for issue and execution. This register dependency skipping allows the Conditional Branch instruction 230 to execute without waiting for the Compare Immediate instruction 220 to finish execution and produce its result. In addition, the Compare Immediate instruction 220 will be auto-finished (finish without execution) when the dependent Conditional Branch instruction 230 is dispatched to provide additional performance improvement. In the process steps below, "Dispatch" refers to the dispatch module unit in a processor. As may be appreciated, the proposed approach saves processing time and increases efficiency in the CPU.

Example Process:

Dispatch determines that a Load instruction 210 is being dispatched. Dispatch writes destination STF_tag, ITAG, Load bit, and W bit into the Mapper. Upon determining a Compare Immediate is being dispatched, Dispatch may read the Mapper for the Load's slice target file tag (STF_Tag), instruction tag (ITAG), Load bit, and W bit (written bit). The result data is written (or going to be written) and available for the dependent instruction to use as a source operand. The issue queue can issue if W=1 for all of its source operands. If the Load bit=1, then all the information is written into a Compare_Imm_info register along with the Immediate field of the Compare Immediate instruction 220. This register now holds information that the Compare Immediate instruction 220 is waiting for before it can be executed. The Compare_imm_info stage also holds the ITAG of the Compare Immediate instruction 220, which will be used for auto-finishing when the dependent Branch instruction is dispatched. Depending on whether a Conditional Branch instruction 230 is being dispatched, Dispatch may control the Conditional Branch instruction 230 to grab the STF_tag, ITAG, W bit, and Compare's Immediate from the Compare_Imm_info register and write these into the Issue Queue along with the Branch instruction. In the exemplary embodiment shown, the retrieval of the STF_tag, ITAG, W bit, and Compare's Immediate may occur through a bypass mux. The Bypass Mux shows that the branch instruction can get the compare information directly from the compare instruction (if both are dispatched at the same time) or from the Compare_imm_info register. The Compare's Immediate is a field in the compare instruction itself. Specifically, it is the value that is being compared against. In block 140 of FIG. 1, the "Immediate" after "GPR5" is where this data comes from. If the Compare and Branch instructions are dispatching in the same cycle, then the bypass mux will select these pieces of information from the Mapper and Dispatch bus instead.

The Compare_imm_info is accessed when the dependent Conditional Branch instruction 230 is Dispatched for auto-finishing of the Compare Immediate instruction 220. The Compare's ITAG is then sent to the finish logic without waiting for execution. If the Compare and the Branch instructions are dispatched in the same cycle, then the Compare instruction may be auto-finished and may not be written into the Issue Queue 240.

The Compare Immediate instruction 220 ITAG from the Compare_imm_info stage may also be sent to the CR Mapper 250 to deallocate the Compare's destination for another instruction to use. At this time the CR mapper 250 may also be updated with the Conditional Branch instruction 230 ITAG (as CR destination) so that younger instruction will know to depend on the Conditional Branch instruction 230 and not the Compare Immediate instruction 220.

The Compare Immediate instruction 220 ITAG may also be sent to the Issue Queue 240 to locate and deallocate the Compare Immediate instruction 220 so that the Compare Immediate instruction 220 will no longer be issued for execution.

The Conditional Branch instruction 230 may then write into the Issue Queue 240. S2 field of the Issue Queue 240 will now contain the Compare's STF_tag, ITAG, and W bits. When the Load instruction 210 is issued for execution, the Load instruction 210 may wake up the Conditional Branch instruction 230. The Conditional Branch instruction 230 may be issued and executed when it becomes the oldest ready instruction. The issuing Conditional Branch instruction 230 may also broadcast its ITAG to the Mapper and the Issue Queue to wake up instructions that are dependent on its CR result. The Conditional Branch 230 will read the load's write back result field (RA field) from the STF (using the S2_STF_tag) for the load's write back result. It will also get the Compare's Immediate field from the issuing Branch instruction. The Conditional Branch 230 execution of the branch instruction here occurs after the instruction entered the issue queue and specifically at the time of issue. The execution starts at issue time and refers to the information that the execution-of-the-branch requires and where that information is obtained within the microarchitecture. The RA data will then be compared with the immediate field to produce the condition code CR0. The Conditional Branch instruction 230 will then resolve the prediction using the resulting CR0 bits that it has produced earlier. The condition code generated by the executing Branch instruction will then be written back to the CR0 register and will also be sent to the dependent instructions for wake up and issue/execution. The Branch instruction is then finished.

Example Computer Platform

Figure 3:
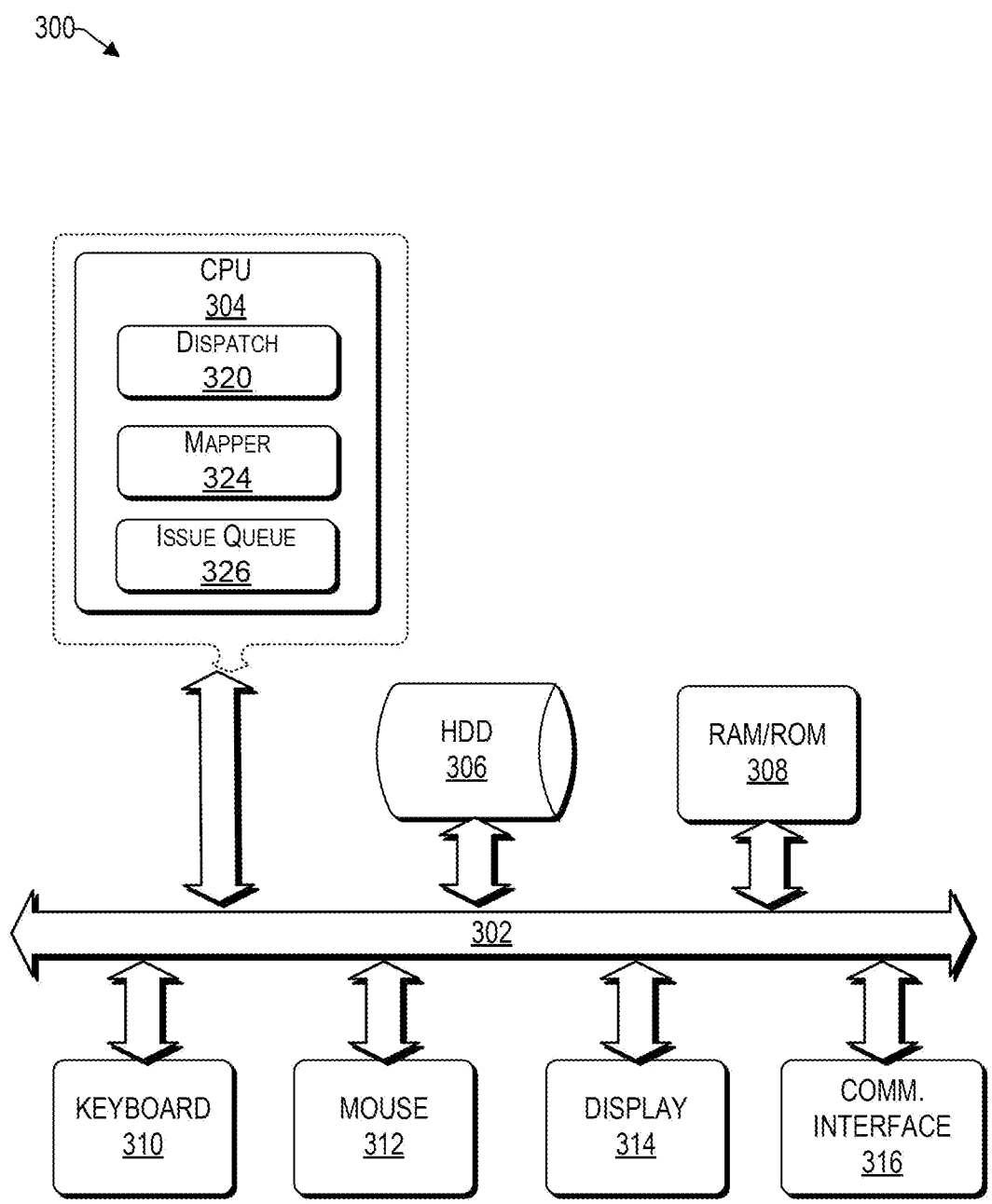
FIG. 3 is a functional block diagram illustration of a computer hardware platform that can communicate with various networked components.

As discussed above, functions relating to dependency skipping in the execution of processor functions are performed with the use of a computing device. FIG. 3 is a functional block diagram illustration of a computer hardware platform that can communicate with various networked components or operate as a standalone device. FIG. 3 shows a computing device 300 which may be for example, a personal computer, a network computer platform, or a host computer platform.

The computer platform 300 may include a central processing unit (CPU) 304, a hard disk drive (HDD) 306, random access memory (RAM) and/or read only memory (ROM) 308, a keyboard 310, a mouse 312, a display 314, and a communication interface 316, which are connected to a system bus 302.

In one embodiment, the HDD 306, has capabilities that include storing a program that can execute various processes, such as the processes described in FIGS. 1 and 2, in a manner described herein.

The CPU 304 may include architecture for processing instructions. The architecture may include at least a dispatch unit 320, a mapper 324, and an issue queue 326.

Example Architecture

Figure 4:
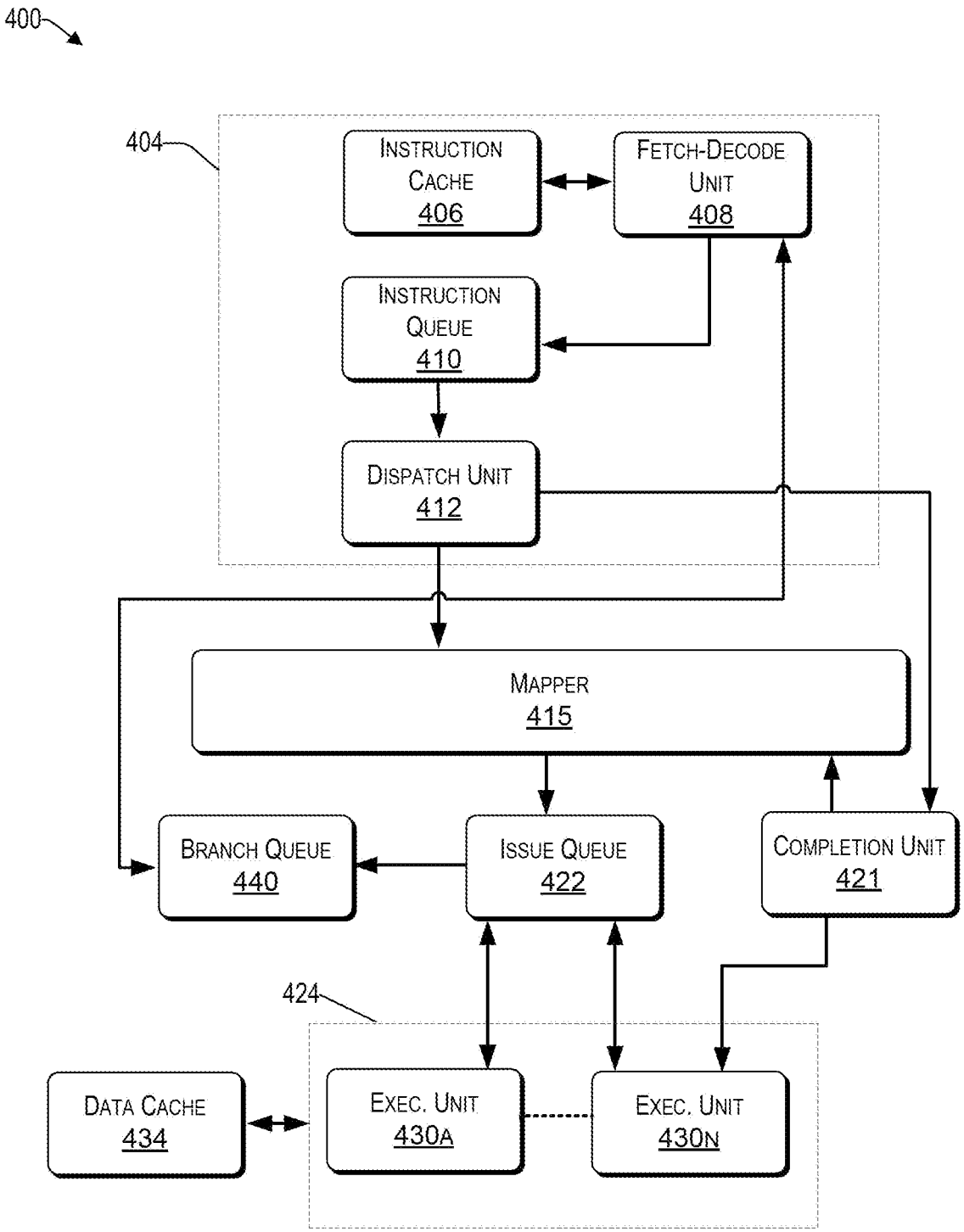
FIG. 4 is a block diagram of a computer processor architecture in accordance with embodiments.

Referring now to FIG. 4, a processor 400 and a processing environment are described according to an exemplary embodiment. In one example, the processor 400 retrieves instructions from memory (e.g., RAM 308 of FIG. 3) and loads them into instruction sequencing logic (ISL) 404. The instruction sequencing logic includes, for instance, an instruction cache 406, a fetch-decode unit 408, an instruction queue 410 and a dispatch unit 412. Instructions are retrieved from instruction cache 406 and decoded by fetch-decode unit 408. After decoding a current instruction, the current instruction is loaded into instruction queue 410. Dispatch unit 412 dispatches instructions from instruction queue 410 into mapper module 415, as well as completion unit 421. Completion unit 421 is coupled to a general execution engine 424 (comprising branch execution units 430A-430N) and mapper module 415 and is configured to determine when an issued instruction has completed. The processor 400 further includes a branch queue 440 in signal communication with the branch execution units 430A-430N, the issue queue 422, and the fetch-decode unit 408.

After the mapper module 415 has mapped the current instruction, issue queue 422 issues the current instruction to execution units 430A-430N of general execution engine 424. In this example, execution unit 430A ma be referred to as a branch execution unit 430N.

The general execution engine 424 exchanges data with data memory via a data cache 434. Moreover, issue queue 422 may contain instructions for executing the conditional branch. Issue queue 422 serves as the gatekeeper before the branch instruction is issued to one or more execution units 430A-430N for execution. As a general rule, an instruction cannot leave issue queue 422 if it depends upon an older instruction to finish. However, in the exemplary embodiments shown, the conditional branch instruction skips waiting for the compare immediate instruction. As described above, the mapper module 415 may be updated with the conditional branch instruction 230 ITAG (See FIG. 2) so that younger instruction will know to depend on the conditional branch instruction 230 and not the compare immediate instruction 220.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of performing instructions in a computer processor architecture, comprising:
    determining that a load instruction is being dispatched;
    writing destination related data of the load instruction into a mapper of the architecture;
    determining that a compare immediate instruction is being dispatched;
    determining that a branch conditional instruction is being dispatched; and
    configuring the branch conditional instruction to wait until the load instruction produces a result before the branch conditional instruction issues and executes, wherein:
        the branch conditional instruction is executed without waiting for a finish of the compare immediate instruction; and
        execution of the branch conditional instruction comprises performing a comparison with the destination related data of the load instruction.

2. The method of claim 1, wherein the finish of the compare immediate instruction is an auto-finish step triggered in response to the branch conditional instruction being dispatched.

3. The method of claim 2, further comprising:
    accessing the load instruction destination related data in the compare immediate instruction in response to the conditional branch instruction being dispatched for auto-finishing of the compare immediate instruction; and
    sending the load instruction destination related data in the compare immediate instruction to a finish logic without waiting for the finish of the compare immediate instruction.

4. The method of claim 3, further comprising:
    sending the load instruction destination related data in the compare immediate instruction to a control registry mapper; and
    deallocating the load instruction destination related data in the compare immediate instruction.

5. The method of claim 4, further comprising sending the load instruction destination related data in the compare immediate instruction to an issue queue to locate and deallocate the compare immediate instruction so that the compare immediate instruction will no longer be issued for execution.

6. The method of claim 1, further comprising:
    the branch conditional instruction retrieving information relevant to the finish of the compare immediate instruction;
    the branch conditional instruction performing a computation associated with the compare immediate instruction; and
    the branch conditional instruction writing a correct control register value at execution.

7. The method of claim 1, further comprising:
reading the mapper for load instruction destination related data;
writing the load instruction destination related data into the compare immediate instruction; and
using the load instruction destination related data by the compare immediate instruction, during the finish of the compare immediate instruction.

8. The method of claim 7, further comprising:
the branch conditional instruction retrieving the load instruction destination related data from a register associated with the compare immediate instruction; and
writing the load instruction destination related data and the branch conditional instruction into an issue queue.

9. A method of performing instructions in a computer processor architecture, comprising:
determining that a load instruction is being dispatched;
writing destination related data of the load instruction into a mapper of the architecture;
determining that a compare immediate instruction is being dispatched;
determining that a branch conditional instruction is being dispatched;
reading the mapper for load instruction destination related data;
writing the load instruction destination related data into the compare immediate instruction;
using the load instruction destination related data by the compare immediate instruction, during a finish of the compare immediate instruction;
configuring the branch conditional instruction to wait until the load instruction produces a result before the branch conditional instruction issues and executes, wherein:
the branch conditional instruction is executed without waiting for a finish of the compare immediate instruction;
execution of the branch conditional instruction comprises performing a comparison with the destination related data of the load instruction; and
the finish of the compare immediate instruction is an auto-finish step triggered in response to the branch conditional instruction being dispatched;
accessing the load instruction destination related data in the compare immediate instruction in response to the conditional branch instruction being dispatched for auto-finishing of the compare immediate instruction; and
sending the load instruction destination related data in the compare immediate instruction to a finish logic without waiting for the finish of the compare immediate instruction.

10. The method of claim 9, further comprising:
the branch conditional instruction retrieving information relevant to the finish of the compare immediate instruction;
the branch conditional instruction performing a computation associated with the compare immediate instruction; and
the branch conditional instruction writing a correct control register value at execution.

11. The method of claim 9, further comprising:
sending the load instruction destination related data in the compare immediate instruction to a control registry mapper; and
deallocating the load instruction destination related data in the compare immediate instruction.

12. The method of claim 11, further comprising sending the load instruction destination related data in the compare immediate instruction to an issue queue to locate and deallocate the compare immediate instruction so that the compare immediate instruction will no longer be issued for execution.

13. A computer processor architecture, comprising:
a dispatch module configured to:
determine that a load instruction is being dispatched;
write destination related data of the load instruction into a mapper of the architecture;
determine that a compare immediate instruction is being dispatched;
determine that a branch conditional instruction is being dispatched; and
configure the branch conditional instruction to wait until the load instruction produces a result before the branch conditional instruction issues and executes, wherein:
the branch conditional instruction is executed without waiting for a finish of the compare immediate instruction; and
execution of the branch conditional instruction comprises performing a comparison with the destination related data of the load instruction.

14. The computer processor architecture of claim 13, wherein the finish of the compare immediate instruction is an auto-finish step triggered in response to the branch conditional instruction being dispatched.

15. The computer processor architecture of claim 14, further configured to:
access the load instruction destination related data in the compare immediate instruction in response to the conditional branch instruction being dispatched for auto-finishing of the compare immediate instruction; and
send the load instruction destination related data in the compare immediate instruction to a finish logic without waiting for the finish of the compare immediate instruction.

16. The computer processor architecture of claim 15, further configured to:
send the load instruction destination related data in the compare immediate instruction to a control registry mapper; and
deallocate the load instruction destination related data in the compare immediate instruction.

17. The computer processor architecture of claim 16, further configured to send the load instruction destination related data in the compare immediate instruction to an issue queue to locate and deallocate the compare immediate instruction so that the compare immediate instruction will no longer be issued for execution.

18. The computer processor architecture of claim 13, wherein:
the branch conditional instruction is operative to retrieve information relevant to the finish of the compare immediate instruction;
the branch conditional instruction is operative to perform a computation associated with the compare immediate instruction; and
the branch conditional instruction is operative to write a correct control register value at execution.

19. The computer processor architecture of claim 13, further configured to:
read the mapper for load instruction destination related data;
write the load instruction destination related data into the compare immediate instruction; and use the load instruction destination related data by the compare immediate instruction, during the finish of the compare immediate instruction.

20. The computer processor architecture of claim 19, wherein
the branch conditional instruction is operative to retrieve the load instruction destination related data from a register associated with the compare immediate instruction; and
write the load instruction destination related data and the branch conditional instruction into an issue queue.

* * * * *